United States Patent [19]
Janus

[11] Patent Number: 5,620,235
[45] Date of Patent: Apr. 15, 1997

[54] VEHICLE WHEEL

[75] Inventor: Jonny Janus, Dimeldorf, Germany

[73] Assignee: Stahlschmidt & Maiwork GmbH, Werdohl, Germany; a part interest

[21] Appl. No.: 454,126

[22] PCT Filed: Feb. 19, 1994

[86] PCT No.: PCT/EP94/00484

§ 371 Date: Jun. 7, 1995

§ 102(e) Date: Jun. 7, 1995

[87] PCT Pub. No.: WO94/19204

PCT Pub. Date: Sep. 1, 1994

[30] Foreign Application Priority Data

Feb. 21, 1993 [DE] Germany .......................... 43 05 235.5
Jul. 28, 1993 [DE] Germany .......................... 43 25 292.3

[51] Int. Cl.$^6$ ......................................................... B60B 21/00
[52] U.S. Cl. .......................................... 301/95; 152/381.4
[58] Field of Search ................................. 301/38.1, 39.1, 301/37.22, 95; 152/379.4, 379.3, 379.5, 381.4, 522, 523

[56] References Cited

U.S. PATENT DOCUMENTS

| | | | |
|---|---|---|---|
| 2,347,622 | 4/1944 | Tschanz | 301/97 |
| 2,996,096 | 8/1961 | Powers | 152/352 |
| 3,508,790 | 4/1970 | Holmes | 301/39 |
| 3,770,323 | 11/1973 | Isaacson | 301/38 R |
| 3,951,192 | 4/1976 | Gardner et al. | 152/379 R |
| 4,235,271 | 11/1980 | Olsen et al. | 152/186 |
| 5,082,040 | 1/1992 | Spitz | 152/379.3 |
| 5,092,661 | 3/1992 | Meyers | 301/37 ST |
| 5,373,884 | 12/1994 | Kamegawa et al. | 152/454 |

Primary Examiner—David M. Mitchell
Assistant Examiner—Jonathan J. Yun
Attorney, Agent, or Firm—Pearne, Gordon, McCoy & Granger

[57] ABSTRACT

A vehicle wheel has a rotatively mounted rim and a pneumatic tire detachably arranged thereon. The tire has a body with a torus-shaped cross section, an approximately cylindrical running surface and two radial side walls. Two tire seats reinforced by traction-resistant core rings for fastening the tire between horns arranged at the ends of the rim are located at the ends of the tire which face the rim. At least one of the horns of the rim has a greater radial length and extends at least up to the middle area of the respective side wall of the tire. The side walls of the tire are flexible in the whole area between the tire seats and the tire shoulders.

7 Claims, 3 Drawing Sheets

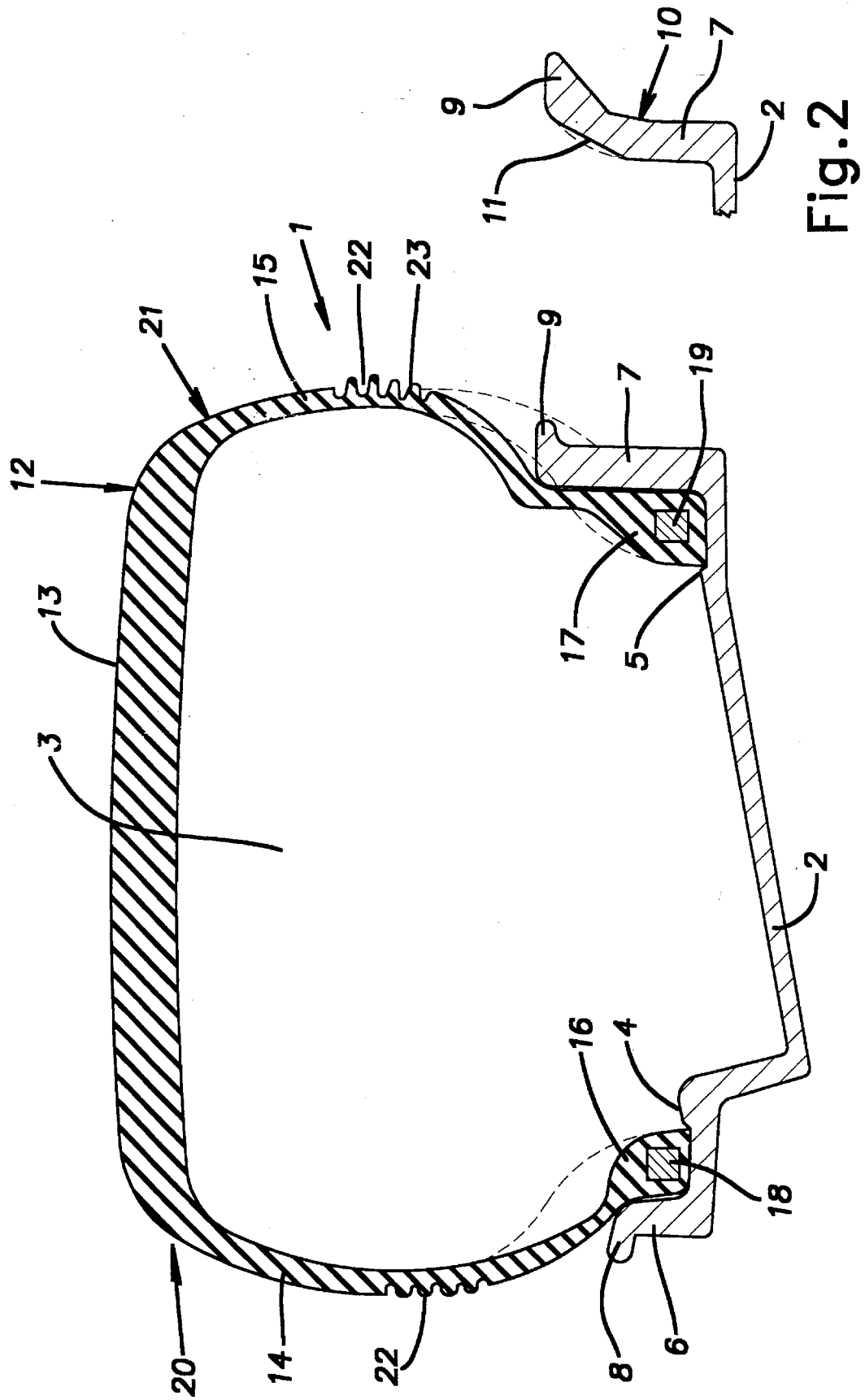

VEHICLE WHEEL

BACKGROUND OF THE INVENTION

The invention relates to a vehicle wheel comprising a rim designed to be mounted for rotation and a pneumatic tire detachably mounted on the rim. The tire has a body which is of torus shape in cross-section and which has a roughly cylindrical running surface or tread as well as two radially extending side walls and at the edges next to the rim it has seatings or beads reinforced by inextensible bead wires, the beads being designed to be arranged and secured between flanges on the rim.

Currently in vehicle wheels the pneumatic tire acts as that structural element which has to transmit all the forces in use from the vehicle to the road and vice versa. Accordingly the endeavours of the manufacturer are concentrated on optimizing the tire, in particular with regard to its characteristics in use, namely the handling, the rolling resistance, the co-efficient of friction between the tire and the road surface, comfort and wear, if possible without forfeiting advantages and qualities already achieved.

Vehicle wheels of this kind are currently known and normal in vehicles of all kinds, in particular in motor vehicles and associated trailers.

In recent years development has been concentrated on finding improvements in pneumatic tires, and in particular in the breakers or reinforcements of them. As a result impressive improvements in tires have also been achieved, This concentration of the development efforts on the breaker and running surface area of the tires which are known and used at the present day does, however, leave neglected the fact that also the structurally stiffened so-called chafer strips, which are present in the side walls radially above the beads at about the level of the carcass plies, are subjected to "working" at a high frequency as a consequence of the lateral bulging initiated by the peripheral disturbance in the contact area, but also in the region of so-called chafer strips or standing wave and the enlargement of radius over the whole unloaded periphery caused by tangential displacement action of a reinforcement belt or breaker which is stiff against expansion and compression, and therefore, by absorbing driving energy they add quite substantially to the rolling resistance of the tire.

This problem cannot be overcome or influenced by improvements to the breaker. All the improvements achieved hitherto in the rolling resistance of the tire have in practice only been achieved by improvements in the breaker and running surface regions.

In particular up to now too little account has been taken of the fact that the tire is only one part of the wheel system and the rim on which the tire is mounted is the other part of this wheel system.

Despite all efforts in design and in specific materials aimed at stiffening the base wall or chafer strip region, the currently orthodox chafer strips de form under the effect, during use, of up to 100 changes of flexing load per second and thereby they develop—according to the design and the operating conditions—30 to 50% of the overall rolling resistance of the tire. In addition to this spectacular deformation work from the wheel load and the side forces the stiffened chafer strips are permanently loaded during use by the toe-in and the camber of the wheel.

This more inconspicuous working of the chafer strip regions is indeed overshadowed by the working from wheel load and side forces, yet it does consume an avoidable specific fraction of the driving energy.

SUMMARY OF THE INVENTION

This invention ms based on the recognition that in order to improve the characteristics of pneumatic tires in use, while at the same time preserving advances which have already been achieved, it is not sufficient to undertake improvements only in the breaker or belt region, but for this purpose to include also, through consideration of the wheel system as a whole, the side wall region of the tire with the problematic chafer strips and the rim as joint partners in the solution. This recognition is supported by analysis of machine tests to destruction, according to which the regions in the tire which offer a large resistance to deformation against distortions arising in operation are very much warmer than regions which deform easily. Thus, it was found that the resistance to deformation is in direct relation to the energy absorption and the rolling resistance, and that it must be of advantage to make those regions of the tire which are subjected to permanent unavoidable deformations particularly easily deformable.

Accordingly, the invention is based on solving the problem of providing a pneumatic-tired vehicle wheel in which the rim not only serves as retention means for the tire but with the given height-width ratio which is prescribed in the interest of a maximum volume of air it also takes on closely defined supporting functions for the tire mounted on it, which functions it hitherto could fulfill only to a limited extent and at the expense of a high energy loss, and in which the pneumatic tire designed for the rim has side walls which are made as flexible as possible in bending between the beads and the shoulders of the tire.

This problem is solved according to the invention by means of a vehicle wheel which has the features of claim 1. Advantageous embodiments of the invention are the subject of the subsidiary claims.

By the invention, in which the wheel system is looked at as a whole, it is possible to unlock reserves which permit improvements in the characteristics in use which were hitherto not attainable as the tire and the rim had been regarded as separate respective structural elements. Thus, the present invention includes both the construction of the side wall of the tire in particular in the region of the usual so-called chafer strip above the bead at the transition zone to the rim and also the construction of the rim itself for receiving a share, according to the invention, of the functions within the wheel system between the tire and rim.

In the pneumatic-tired vehicle wheel according to the invention primarily all those functions fall on the tire which are necessary for a desired elastic radial deformation, while the rim has to fulfill all those functions in which a stable lateral behavior is of advantage.

The side walls of the tire which are flexible in bending according to the invention are it is true, still deformed by the wheel load, the lateral forces and the basic loads from toe-in and camber, but in this connection they absorb only a fraction of the driving energy which the orthodox stiff beads convert through inner friction into a critical amount of waste heat up to 130° C.

In the pneumatic-tired vehicle wheel according to the invention the tire should primarily yield resiliently in a radial direction as a consequence of as great as possible a volume of air, its side walls being made as flexible as possible in bending, so that as little as possible of the driving energy is absorbed when it deforms and the ride comfort is improved. For this purpose tangentially extending flexible grooves can be arranged in the side walls, providing local assistance to a further reduction in the resistance to deformation.

At the same time these side walls can be shaped in the regions respectively between the above-mentioned flexing grooves as laterally projecting ribs in order to offer improved local protection for the flexibly bending side walls against possible damage from contact with curbs.

By contrast the rim, by virtue of the radial extension outwards of at least the inside flange up to about the height of the bead, stiffened by chafer strips or core rubber and other measures, and now omitted, takes over the function of lateral support of the flexible inside side wall of the tire against forces of all kinds acting from outside to inside.

The expression "inside" in the description of the rim and the tire, cross-section and of the side walls respectively refers to that side which is nearer the center-line of the vehicle.

On account of the unequal-height stability of shape of the rim material, against which the respective inside tire side wall abuts, the lateral distortion of both side walls of the tire on the outside of a bend can be particularly effectively reduced, so that new freedom is opened up to the designer, for example in the layout of the breaker and reinforcing plies or in the amount wheel system achieved on the basis of the higher lateral form stability of the inside flange of the rim of the wheels on the outside of a bend is of particular significance in so far as the wheels on the outside of the bend, as a consequence of the oscillatory movements of the vehicle arising from centrifugal force, can be so significantly more heavily loaded that in the extreme case the inside wheels on the inside of the bend can lift off completely and thereby the directional control is exerted solely by the wheels of the vehicle which are on the outside of the bend, without that leading to a reduction in the lateral stability.

A comparable result cannot be achieved using orthodox stiffened chafer strip regions for transmitting lateral forces as the known chafers made of rubber cannot be nearly so stiff, and act as a bending load carrier supported only on one side and under lateral loadings both bend and also deviate or turn about the inextensible reinforcing wire of the bead. Here therefore in comparison significant relative movements of the conventional chafers take place in relation to the normal rim flanges so that the lateral distortion arising under the effect of the lateral forces including the diaphragm portions above the chafer region is greater than in the wheel system according to the invention.

In the vehicle wheel according to the invention the inside side wall of the tire is supported by the higher inside flange of the rigid rim that for example any lateral distortion of the cross-section of the tire on the side of the vehicle which is on the outside of the bend by outward movement or outward bulging on inward lateral forces turns out overall smaller than in a conventional tire of comparable structural height and air volumes with beads on a conventional rim.

Accordingly, steering movements can be much more precise and on curved paths are transmitted by the rim to the crown of the tire.

In the vehicle wheel according' to the invention the rolling resistance of the tire is reduced by about the amount of the hitherto flexing work of the now omitted chafer strip, whilst there is at the same time an the increase in the directional stability. On travel in curved paths the response is improved and the roll angle reduced.

In comparative tests it was found that tires having the very flexible side walls according to the invention and with identical air volumes and pressures deflect by 2 mm more strongly and despite the resulting greater work in the steel cord belt up to 100 Km/h a significant reduction in the overall rolling resistance is shown compared to conventional tires of the same dimensions. If on the other hand the degree of deflection is kept to the level of that of the conventional tire having the known bead chafer strips or hard wall rubber breakers, by increasing the tire pressure the rolling resistance is reduced drastically, but without adversely affecting comfort, as the radial spring characteristic of the flexible tire walls according to the invention is characteristically softer than that of the stiffer side walls of the conventional tire of the same height-width ratio.

Further scope for development for the wheel system according to the invention is offered by the interaction of the flexible side walls with a defined expandable and compressible tire reinforcement belt or breaker as hereby the damaging tangential distortions of the side walls as a consequence of the compressing movements of the conventional compression-stiff reinforcement belt can be avoided. In this connection the flexible design of the side walls also acts generally by de-coupling the working of the reinforcement belt or breaker from the loading of the side walls at the transition to the flanges of the rim in a positive way.

For the construction of the rim having radially heightened flanges on both sides the rim can also be made in two parts so that the tire can be fitted.

By an arrangement having the outline of the heightened flanges of the rim drawn in so that their steeper profiles deflect the natural bending contour of the soft side walls in a direction towards the middle of the rim, the side wall of the tire thus engaged can be so pre-loaded by the air pressure that it responds immediately to the build up of a lateral force and does not have to deform first in response to an impact. This delivers the precision and response of the tire in a further manner according to the invention.

By the pre-loading according to the invention, preferably of the inside side wall, there is produced on the inside higher flange of the rim a contact which is of such a mechanical and frictional nature such that chafing is impossible. In the vehicle wheel according to the invention, the side walls of the tire can be formed to be softer and more elastic without any adverse effect on the lateral stability because the heightened inside flange of the rim takes on the task of lateral support.

Where the rim is made in one piece the outside flange of the rim has a normal, that is to say minimal radial extent in order to allow the tire to be fitted and removed, whereas the inside flange of the rim is made of extended form and takes care of the lateral support of the tire, or rather of its inside side wall, against external forces.

The outside flexible side wall of the tire resting against the outer flange of the rim can fulfill without restraint its comfort function by low-energy deflection or spring action without thereby adversely affecting the lateral stability.

The side walls of the tire are now no longer structurally stiffened by chafer strips, core rubber or other things but are made as flexible diaphragms over their entire height between the beads and the shoulders, so that it only still requires minimal internal work to bulge laterally, thereby also avoiding the damaging high working temperature in the chafer region which can arise and which at high road speeds can also be a danger to operational strength.

In a known vehicle wheel having a rotatably mounted rim and a pneumatic tire detachably mounted thereon it is known (U.S. Pat. No. 4,308,907) to provide at the external ends of the rim radially extending upstanding flanges which support the side walls of the tire externally up to the central region thereof. These rim flanges fit in their shape and arrangement with the natural contour of the tire in order to avoid bulging of the tire under load.

BRIEF DESCRIPTION OF THE DRAWINGS

An embodiment by way of example of a vehicle wheel according to the invention is illustrated diagrammatically in the drawing, in which FIG. 1 is a cross-section through the rim and the pneumatic tire mounted on it, FIG. 2 is a partial section of another embodiment showing a modification of the rim of FIG.1 in the region of the heightened flange of the rim on the inside.

DETAILED DESCRIPTION OF THE DRAWINGS

Figure 3:
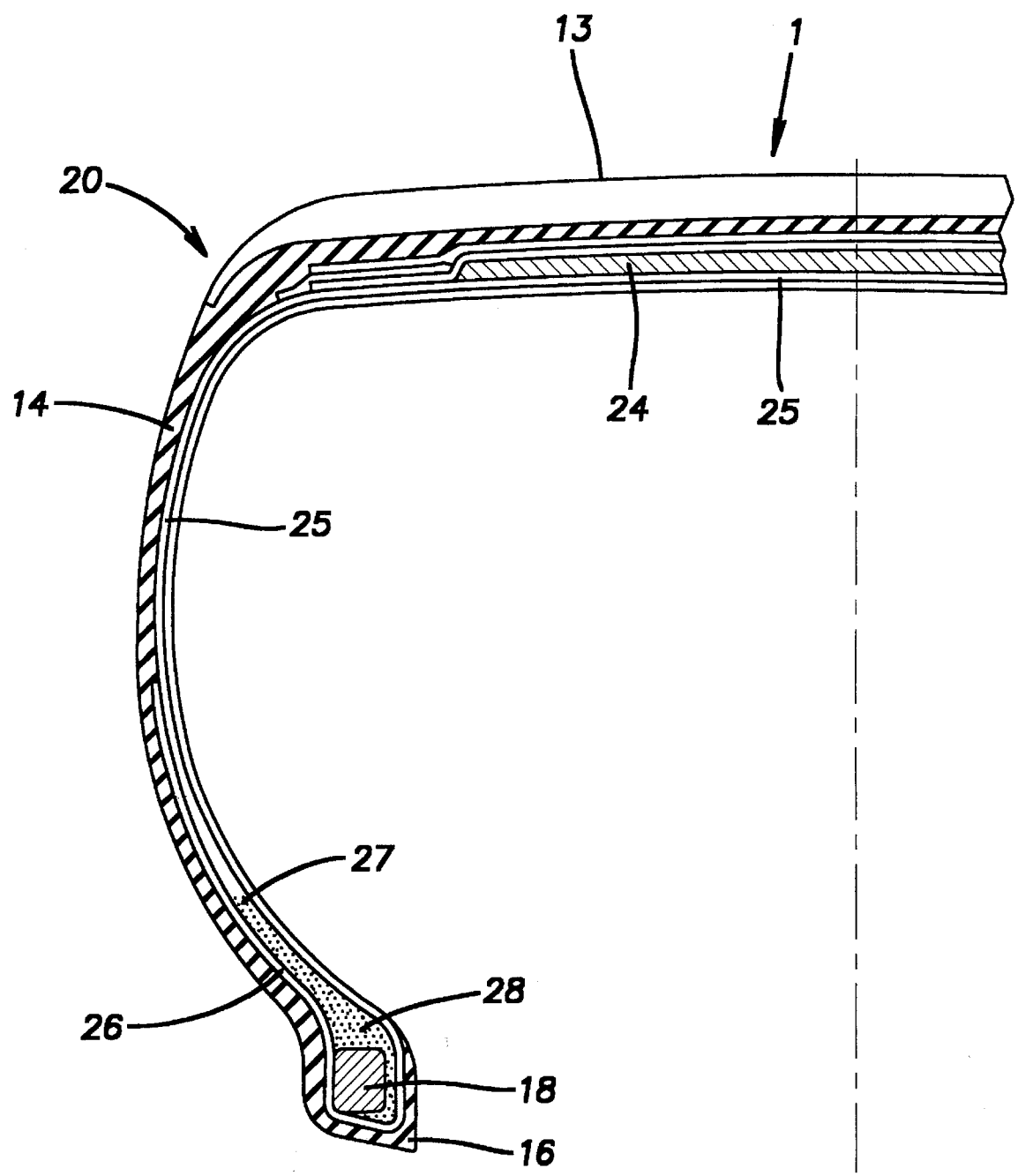
FIG. 3 is a partial section through the tire according to the invention, from which-further features of the tire can be seen.

The vehicle wheel 1 illustrated in FIG.1 comprises a wheel-shaped rim 2 made of metal and a pneumatic tire 3 which is mounted on it and which is manufactured substantially from flexible material such as vulcanized caoutchouc or rubber.

The rim has near each of its outer ends respective engaging surfaces 4 and 5 for beads, described below, of the tire when fitted. In addition the one-piece rim 2 in the example which is described and illustrated has on its outer edges a respective raised flange 6 or 7 in order to retain the tire 3 in place on the rim 2 with side wall contours different from those indicated by the natural curving profiles shown in dotted line in FIG. 1.

In the example illustrated the flange 6 present on the outside of the rim is shorter in its radial extent than the flange 7 present on the inside of the rim. Each of the two flanges 6 and 7 has an outwardly projecting nose 8 or 9 which produces a curved or progressive transition from the radial portion of the flange in an outward direction in order to avoid any sharp-edged contact between the rim 2 and the tire 3.

In the modification of the inside flange 7 which is illustrated in FIG. 2 there is an arcuate portion (shown in the dotted line) or an inclined portion 11 (shown in solid line) provided between the outwardly extending nose 9 and the radially extending portion 10 of the flange 7, this portion 11 forming a progressive transition between the radially extending portion 10 and the outwardly projecting nose 9 in order to avoid excessive inward deflection of the tire 3 in the region of the rim.

The tire 3 present on the rim 2 in FIG.1 has a body 12 which is of torus shape in cross-section and which has a substantially cylindrical running surface or tread 13 and two approximately radially extending side walls 14 and 15 which are formed over their entire length and radial extent as flexible diaphragms.

On the inner edge of each of these side walls 14 and 15 there is a respective ring-shaped thickened bead or seating 16 and 17, an inextensible bead wire 18 and 19 being arranged in each of the beads.

The beads 16 and 17 are made of thickened form on account of the wires 18 and 19 mounted in them but the side walls 14 and 15 of the tire 3 are made flexible in the form of a diaphragm over their entire depth between the corresponding bead 16 or 17 and the shoulder 20 or 21 where they meet the tread 13.

As shown in FIG. 1 the flange 7 which is of longer form extends into the region of the adjacent diaphragm-like side wall 15, while the shorter flange 6 ends immediately above the ring-shaped bead so that where the rim 2 is in one piece the tire 3 can be fitted and removed. The radially longer flange 7 on the inside of the rim serves by contrast to give support to the side wall 15 which is formed as a yielding diaphragm, when inwardly directed lateral forces arise. Accordingly, in the wheel according to the invention it is not necessary to arrange reinforcing elements such as stiff chafer strips in the tire 3 in order to handle laterally acting forces, for example when going round bends.

Although the diaphragm-like side walls 14 and 15 of the tire 3 are already extremely flexible because they contain no significant stiffening elements,.,in improve further the flexibility or deflectability of the side walls they can be provided with circumferentially extending grooves 22, of which the depth is variable. In the example shown in FIG. 1 such grooves 22 are provided in the side wall 14 which is shown there on the left.

In order to avoid damage to the side wall of the tire in the region of the grooves 22, for example when the tire is driven against the curb, ribs 23 projecting between the grooves 22 beyond the basic outline of the side wall 15 can be formed between the grooves 22 as illustrated in FIG. 1 in conjunction with the side wall 15.

The grooves 22 and the ribs 23 are however, only provided as a matter of choice, whereby a tire 3, where it has ribs 23 only on one side, is advantageously fitted so that these ribs 23 lie on the outside, because it is there that damage to the grooves 22 is to be expected more than on the inside.

FIG. 3 shows that the tire 3 contains in the region of its tread 13 a breaker 24 and overall a carcass insert or reinforcement 25 which extends from side wall to side wall as far as the beads 16 and 17 and is passed around the bead wires 18 and 19 present at those points, so that in the region of each of the side walls 14 and 15 there is a respective loop 26 of the insert 25 which extends more or less far within the associated side wall in order to achieve good anchorage of the carcass insert 25, made of tire cord, on the associated wires 18 and 19.

Although in FIG. 3 the loop 26 extends above the associated wire 18 spaced from the heart 27 of the carcass insert, the resulting space 28 is not filled with stiff material in order to achieve lateral stability of the tire but with soft filler material such as soft rubber. In the tire 3 according to the invention accordingly, the lateral stability as described more closely above, is determined substantially by the shape of the rim 2.

In the foregoing description of the drawing the rim of the wheel is explained in conjunction with a particular tire of which the side walls are made flexible in the entire region between the beads and the shoulders and accordingly differs from conventional tires. Although it is concerned here with a preferred embodiment the heal can however, also be used with tires of conventional construction, that is to say with tires of which the side walls are not made specially flexible.

Figure 4:
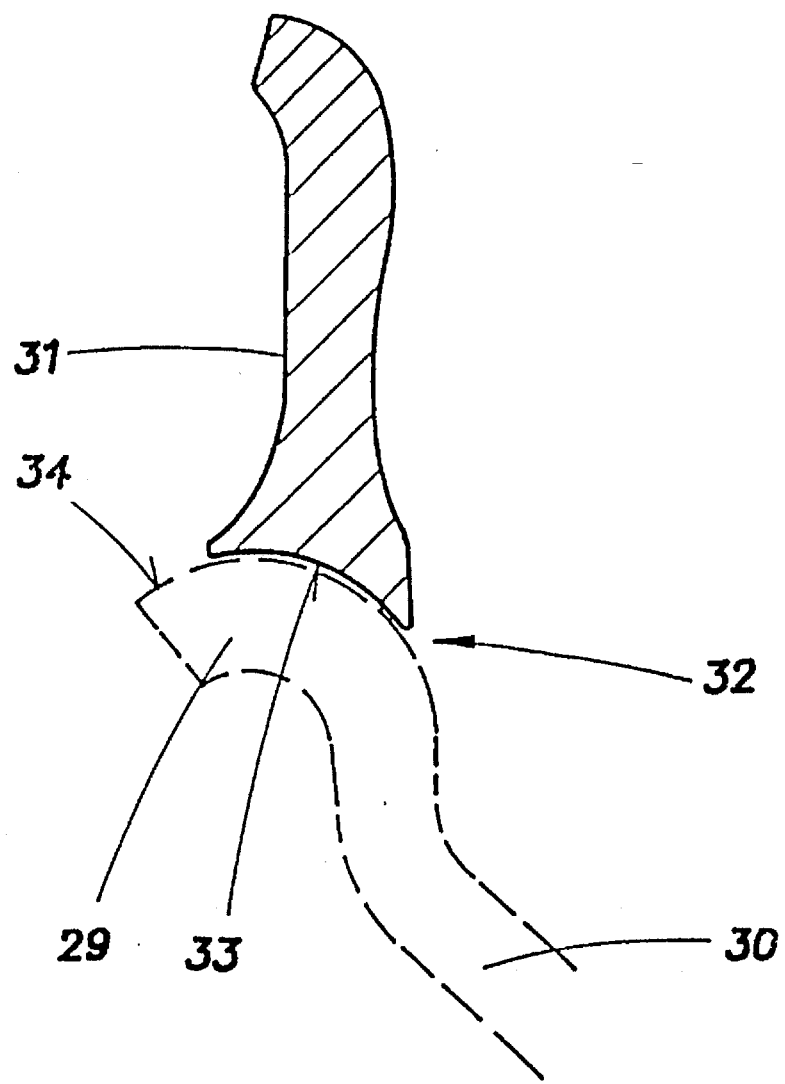
FIG. 4 is a partial section of a conventional rim which is provided in accordance with the present invention with an upstanding flange-like ring.

In FIG. 4 there is illustrated the outwardly bent flange 29 of a conventional rim 30 present on the inside the wheel, not further illustrated, serving as a seating for the bead ring, not further illustrated, of a tire of any design, not illustrated. Shrunk onto the flange 29 of the rim 30 is a ring 31 made of metal which fulfills the function of the heightened flange 7 described above and provides the possibility of equipping existing rims 30 with such a heightened flange.

In this embodiment the ring 31 can be manufactured very easily and uniformly from a rigid material, and has in its concentric extent a closable gap 32 so that it can be placed on the flange 29 of the rim before or even after the tire is fitted.

A further embodiment envisages the use of a ring on the rim which is closed in itself and which is peripherally of such dimensions that the ring 31 is heated for the purpose of mounting it, and after placing over the cooler flange 29 of the rim and after cooling it shrinks onto the latter so that it produces a permanent connection free of play. In this connection the radially inner profile 33 of the ring 31 is made so that it matches the radially outer profile 34 of the flange 29 in order to achieve a mechanical interengagement of the contact faces of the flange 29 and the ring 31. In conjunction with the inextensible construction of the ring 31 accordingly, there is achieved a mechanical permanent and rigid abutment for the side wall of the tire, not shown, so that deformations which could lead to damage to the ground contact areas of the tire are avoided.

I claim:

1. A vehicle wheel comprising a rim having two upstanding flanges in combination with a detachably mounted pneumatic tire received by the flanges, said tire including a body having a torus shape cross-section with a substantially cylindrical running surface connected to two radially extending side walls with inner edges including beads, said sidewalls having a natural outwardly curved profile, said beads being reinforced by inextensible wires and being received by said flanges for detachably mounting the tire to the rim with said side walls each having an outwardly curved profile, one of said flanges having a greater radial extent than the other of said flanges and terminating at an inner flange end disposed substantially adjacent a central region of the adjacent side wall of the tire in supporting engagement therewith to restrain said natural outwardly curved profile of the engaged portion of the side wall, said heightened flange of said rim extending in its radial extent more steeply inwardly than said natural outwardly curved profile to push the engaged portion of the side wall inwardly to a substantially right angle orientation relative to the rim beginning at said inner flange end remote from said bead, and said heightened flange thereby redirecting said outwardly curving profile of the adjacent side wall of the inflated tire to provide said side wall adjacent said heightened flange with a side wall contour different from that of said side wall adjacent said other flange.

2. A wheel according to claim 1 wherein said tire includes a shoulder connected between said running surface and each of said side walls, and each of said side walls has a flexible construction along its entire extent between said beads and said shoulders.

3. A wheel according to claim 1, wherein said side walls comprise a rubber material and contain as the sole reinforcement in the rubber material a carcass insert comprising tire cord.

4. A wheel according to claim 2, wherein said side walls contain as the sole reinforcement in the rubber material a carcass insert comprising tire cord, and said carcass insert includes a loop in the region of each of said beads extending around said inextensible wires.

5. A wheel according to one of claims 1, 2 or 3, wherein said side walls contain circumferentially extending grooves.

6. A wheel according to claim 5, wherein outwardly projecting ribs are provided between said grooves.

7. A wheel according to claim 1, wherein said flange of greater redial extent inlcudes a circumferentially disc-shaped ring providing said greater radial extent.

* * * * *

UNITED STATES PATENT AND TRADEMARK OFFICE
CERTIFICATE OF CORRECTION

PATENT NO. : 5,620,235
DATED : April 15, 1997
INVENTOR(S) : Jonny Janus

It is certified that error appears in the above-indentified patent and that said Letters Patent is hereby corrected as shown below:

Column 8, line 35 (Claim 7, line 2), delete "redial" and insert --radial--.

Signed and Sealed this

Fourth Day of November, 1997

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,620,235
DATED : Apr. 15, 1997
INVENTOR(S) : Jonny Janus

It is certified that error appears in the above-indentified patent and that said Letters Patent is hereby corrected as shown below:

On the title page, item [73] Assignee, should read:
--Stahlschmidt & Maiworm GmbH, Werdohl, Germany; a part interest--

Signed and Sealed this

Eleventh Day of August 1998

Attest:

BRUCE LEHMAN

Attesting Officer Commissioner of Patents and Trademarks